(12) United States Patent
Quintero Manríquez et al.

(10) Patent No.: US 11,885,412 B2
(45) Date of Patent: Jan. 30, 2024

(54) METHOD OF CONTROLLING A DOG CLUTCH

(71) Applicant: Vitesco Technologies Germany GMBH, Hannover (DE)

(72) Inventors: Eduardo Quintero Manríquez, Jalisco (MX); Oscar Eduardo Sarmiento, Nuremberg (DE); Andreas Kelm, Nuremberg (DE); Mario Alberto Chinchilla Saborio, Walderbach (DE); Seyoun Park, Nuremberg (DE)

(73) Assignee: Vitesco Technologies GmbH, Hannover (DE)

( * ) Notice: Subject to any disclaimer, the term of this patent is extended or adjusted under 35 U.S.C. 154(b) by 18 days.

(21) Appl. No.: 17/484,551

(22) Filed: Sep. 24, 2021

(65) Prior Publication Data

US 2022/0010878 A1   Jan. 13, 2022

Related U.S. Application Data

(63) Continuation of application No. PCT/EP2020/058524, filed on Mar. 26, 2020.

(30) Foreign Application Priority Data

Mar. 27, 2019   (DE) ...................... 10 2019 204 294.5

(51) Int. Cl.
*F16H 61/04* (2006.01)
*F16D 11/00* (2006.01)
(Continued)

(52) U.S. Cl.
CPC ............. *F16H 61/04* (2013.01); *B60W 20/30* (2013.01); *B60W 30/19* (2013.01); *F16D 11/00* (2013.01);
(Continued)

(58) Field of Classification Search
CPC ...... F16H 61/04; F16H 61/2807; F16H 61/32; F16H 2061/0075; F16H 2061/0474;
(Continued)

(56) References Cited

U.S. PATENT DOCUMENTS 5,129,286 A * 7/1992 Nitz ...................... F16H 61/061
477/109
5,219,391 A 6/1993 Edelen et al.
(Continued)

FOREIGN PATENT DOCUMENTS

CN    101981336 A    2/2011
CN    103518085 A    1/2014
(Continued)

OTHER PUBLICATIONS

Amthor A., Lorenz A., Zchaeck S., Ament C. "Fourth Order Motion Profile Planning for High Precision Applications", Jan. 2010, Systems Analysis Group, Ilmenau University of Technology, all pages (Year: 2010).*

(Continued)

*Primary Examiner* — Justin Holmes (57) ABSTRACT

The disclosure relates to a method of controlling a dog clutch by a DC motor configured to move the dog clutch via an actuator arm). The dog clutch including at least one gear having one or more dogs configured to engage one or more dogs of a sliding sleeve). The method includes supplying the DC motor with a pulse width modulated voltage having a duty cycle which is provided by a control algorithm). The control algorithm includes a trajectory planner generating a desired position of the actuator arm based on a $4^{th}$ order trajectory planning algorithm and a motion controller based on the sliding mode theory for tracking the desired arm position.

14 Claims, 6 Drawing Sheets

(51) Int. Cl.
  *F16D 28/00*   (2006.01)
  *F16H 61/28*   (2006.01)
  *F16H 61/32*   (2006.01)
  *B60W 20/30*   (2016.01)
  *B60W 30/19*   (2012.01)
  *F16H 61/00*   (2006.01)

(52) U.S. Cl.
  CPC ......... *F16D 28/00* (2013.01); *F16H 61/2807* (2013.01); *F16H 61/32* (2013.01); F16D 2500/1023 (2013.01); F16D 2500/3027 (2013.01); F16H 2061/0075 (2013.01); F16H 2061/0474 (2013.01); F16H 2061/2823 (2013.01)

(58) Field of Classification Search
  CPC ......... F16H 2061/2823; B60W 20/30; B60W 30/19; F16D 11/00; F16D 28/00; F16D 2500/1023; F16D 2500/3027
  See application file for complete search history.

(56) References Cited

U.S. PATENT DOCUMENTS

| | | | |
|---|---|---|---|
| 8,905,212 | B2 | 12/2014 | Vierk et al. |
| 9,169,879 | B2 | 10/2015 | Seiki |
| 9,194,489 | B2 | 11/2015 | Toyota |
| 9,440,656 | B2 | 9/2016 | Hoff |
| 9,989,109 | B2 | 6/2018 | Jonsson et al. |
| 2002/0005077 | A1 | 1/2002 | Ozaki et al. |
| 2005/0234625 | A1 | 10/2005 | Shimojo et al. |
| 2014/0005903 | A1 | 1/2014 | Hanai et al. |
| 2014/0214293 | A1 | 7/2014 | Mori |
| 2016/0047466 | A1 | 2/2016 | Otanez et al. |
| 2016/0258530 | A1 | 9/2016 | Maurer |
| 2016/0290500 | A1 * | 10/2016 | Ono ......... F16H 63/18 |
| 2017/0198766 | A1 | 7/2017 | Onitake et al. |
| 2018/0345787 | A1 * | 12/2018 | Niimi ......... F16D 13/52 |
| 2020/0001860 | A1 | 1/2020 | Rumetshofer et al. |

FOREIGN PATENT DOCUMENTS

| | | | | |
|---|---|---|---|---|
| CN | 105246758 | A | 1/2016 | |
| CN | 105247254 | A | 1/2016 | |
| DE | 102015113130 | A1 | 2/2016 | |
| EP | 0545597 | A1 | 6/1993 | |
| EP | 2515008 | A1 * | 10/2012 | ......... F16H 61/2807 |
| EP | 2762757 | A2 | 8/2014 | |
| FR | 2905437 | A1 | 3/2008 | |
| JP | H01209508 | A | 8/1989 | |
| JP | 2009098965 | A | 5/2009 | |
| JP | 2014149020 | A | 8/2014 | |
| WO | 2010103810 | A1 | 9/2012 | |
| WO | 2018098515 | A1 | 6/2018 | |

OTHER PUBLICATIONS

Chinese Office Action dated Apr. 26, 2022 for corresponding Chinese Application No. 202080024120.9.

Koos van Berkel, Frans Veldpaus et al, Fast and Smooth Clutch Engagement Control for a Mechanical Hybrid Powertrain, IEEE.org IEEE | Xplore Digital Library | IEEE-SA |.

Japanese Office Action dated Oct. 4, 2022 for corresponding Patent Application No. 2021-557199.

International Search Report and Written Opinion dated Jun. 24, 2020 from corresponding International Patent Application No. PCT/EP2020/058524.

* cited by examiner

METHOD OF CONTROLLING A DOG CLUTCH

CROSS-REFERENCE TO RELATED APPLICATIONS

This application claims the benefit of PCT Application PCT/EP2020/058524, filed Mar. 26, 2020, which claims priority to German Application 10 2019 204 294.5, filed Mar. 27, 2019. The disclosures of the above applications are incorporated herein by reference.

TECHNICAL FIELD

The disclosure relates to a method of controlling a dog clutch.

BACKGROUND

In dedicated hybrid transmission (DHT) a secondary power source such as an electric motor is integrated with a combustion engine to improve fuel consumption, efficiency and driving performance. Automated Manual transmission (AMT) is a low-cost solution in powertrains to transmit a demanded torque while synchronizing rotational speed of the shafts which integrate different power sources.

Automated engagements of dry clutches in cars and trucks are typically used for the actuation of energy flow management. They present many advantages in terms of improvement of safety, comfort, reliability, shifting quality and driving performance together with reduction of fuel consumption and pollutant emissions. Several control algorithms for engagement have been proposed in literature, based on techniques such as fuzzy logic, optimal control, feedback linearization and PI control.

An alternative in the mechanical hybrid transmission for gear shift is a dog clutch system which has the benefit of allowing both shafts to turn at the same speed without slipping and with less wear than a dry clutch. The automatic control is applied in a dog clutch system in order to realize a fast and smooth engagement. These two performance targets are contradictive. To achieve smooth gear-shift, the gear engagement duration should be long which reduces the stress on the gear. On the other hand, a fast engagement will increase the dog clutch impact force and the engagement will not be smooth.

Different control devices for dog clutch engagement have been proposed. One control device moves the dog clutch member from the non-connecting position towards the connecting position due to a magnetic force of an electromagnetic coil, and a clutch ring helps the dogs to engage. A second option proposed in the literature is to move the gears of an automated transmission with a linear actuator and a controller using the feedback of a stroke position sensor.

In a low-cost system, a dog clutch does not have synchronizing cones or rings which makes the system simple and small. Also, the control algorithm is restricted to the use of only standard sensors to keep the cost low, and a microcontroller with limited resources for implementation. These conditions require a robust and simple position control algorithm for the engagement and disengagement of a dog clutch system.

In transmissions with a dry clutch the principal problems are: sliding of the dry clutch which affects the performance of the system, friction wear which incurs high cost for replacing.

In dog clutch transmission mechanisms, the main issues are: fast and smooth engagement process due to a smooth engagement require a long time, and a fast engagement increases the impact forces in the dogs, the synchronizing cones or rings support the engagement process, however more components increase the cost.

There is a desire for a control algorithm for a fast and smooth engagement without using synchronizing cones or rings.

In the literature, different control strategies have been developed for the engagement and disengagement of clutch systems taking into account the following issues: engagement time for dry clutches is around 0.4 s and 0.8 s, which is not very short and the shift can be perceived by the driver, high complexity in the control strategies to implement in a low-cost microcontroller, and control algorithms with high dependency of system parameters.

There remains a desire for an improved method of controlling a dog clutch.

SUMMARY

According to one aspect of the disclosure, a method of controlling a dog clutch by an electric motor configured to move the dog clutch via an actuator arm is provided. The method includes supplying the electric motor with a pulse width modulated voltage having a duty cycle which is provided by a control algorithm, the control algorithm includes a trajectory planner generating a desired position of the actuator arm based on a $4^{th}$ order trajectory planning algorithm and a motion controller based on the sliding mode theory for tracking a desired position of the actuator arm.

Implementations of the disclosure may include one or more of the following optional features. In some implementations, the trajectory planner defines a desired position of the actuator arm for the motion controller. The desired position of the actuator arm may be proposed based on derived jerk profiles.

In some implementations, the desired position of the actuator arm for an engagement process of the dog clutch is defined by three phases: approximation, contact and insertion. The three phased engagement process may be carried out in 150 ms or less.

In some implementations, the motion controller applies a sliding mode control defining a sliding surface. The sliding mode controller includes a super-twisting algorithm based on a second order sliding mode controller. In some examples, the sliding mode controller is independent of a motor current of the electric motor to avoid torque ripple and chattering on the control variable.

In some implementations, a reduced sliding surface is defined for the sliding mode controller as a function of a single tracking error variable for the position of the actuator arm. The reduced sliding surface may be based on a stabilization term to reach the sliding surface asymptotically and to avoid high gain control, and based on an integral term to reject unmodeled dynamics and to reduce the steady state error. In some examples, the reduced sliding surface is independent of system parameters, e.g. R, L, $k_t$, $k_e$, J, and gear geometries.

In some implementations, the super-twisting algorithm is used to calculate a control variable which is used to estimate the duty cycle.

According to another aspect of the disclosure, an arrangement including a gearbox and a gear actuator is provided. The gearbox includes a number of gears, and a dog clutch configured to engage at least one of the gears, the gear actuator including an electric motor configured to move the dog clutch via an actuator arm and configured to control the dog clutch by the method described above. In some implementations, the gearbox is a dedicated hybrid transmission.

The disclosure relates to a method of controlling a dog clutch by a trajectory planning control algorithm for a DC motor to transmit a force through a gear actuator, in order to engage and disengage a dog clutch system. Moreover, the proposed control algorithm may have the following advantages: fast engagement process, e.g. 150 ms or less, fast disengagement process, e.g. 150 ms or less, tracking of smooth motion profiles to reduce the impacts on the dogs, robust and simple control algorithm to be implemented in a low-cost microcontroller, no dependence of system parameters, and applicability in a dog clutch system without synchronizing cones or rings.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
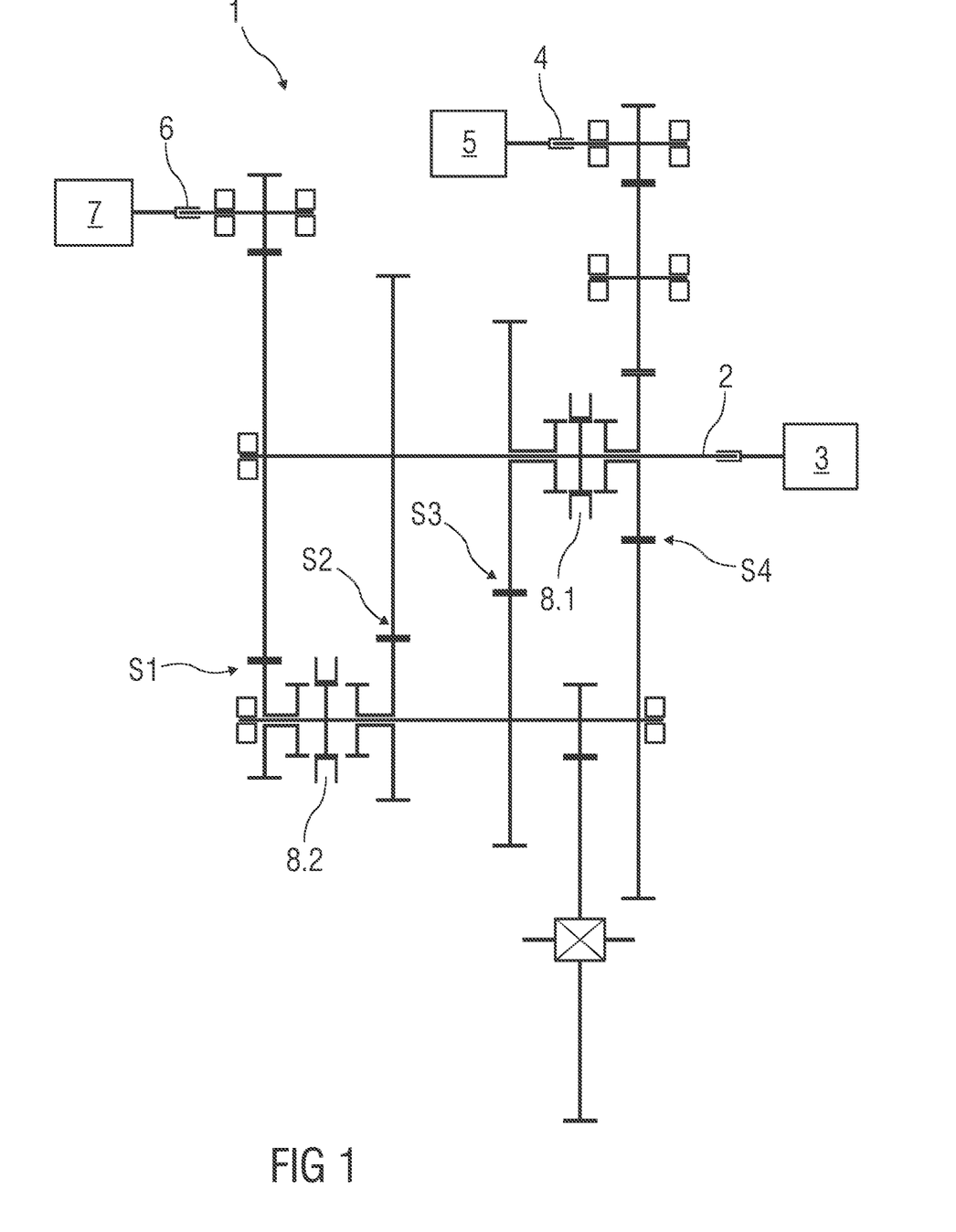
FIG. 1 is a schematic view of a gearbox with dog clutches.

First, an introduction of the system is presented where the control algorithm is implemented. A schematic view of a gearbox 1, such as, a dedicated hybrid transmission (DHT) is shown in FIG. 1.

The gearbox 1 has a first input shaft 2 connected to a combustion engine 3 which may be a cost-effective multi-point injection system. A second input shaft 4 of the gearbox 1 may be connected to a first electric drive 5, e.g. an electric traction drive. A third input shaft 6 of the gearbox 1 may be connected to a second electric drive 7, e.g. a belt starter generator. The gearbox 1 may allow for high speed application of the electric drives 5, 7. The gearbox 1 may be a dedicated hybrid transmission (DHT) which allows for simplified transmission, a minimum number of gears and does not require launch or decoupling elements.

The gearbox 1 has a number of dog clutches 8.1, 8.2, e.g. two dog clutches 8.1, 8.2 to drive a number of shifts S1-S4, e.g. four shifts S1-S4. An electric control unit may be provided for a gear actuator in order to drive the dog clutches 8.1, 8.2. The electric control unit may be operated using a control algorithm presented hereinbelow.

Figure 2:
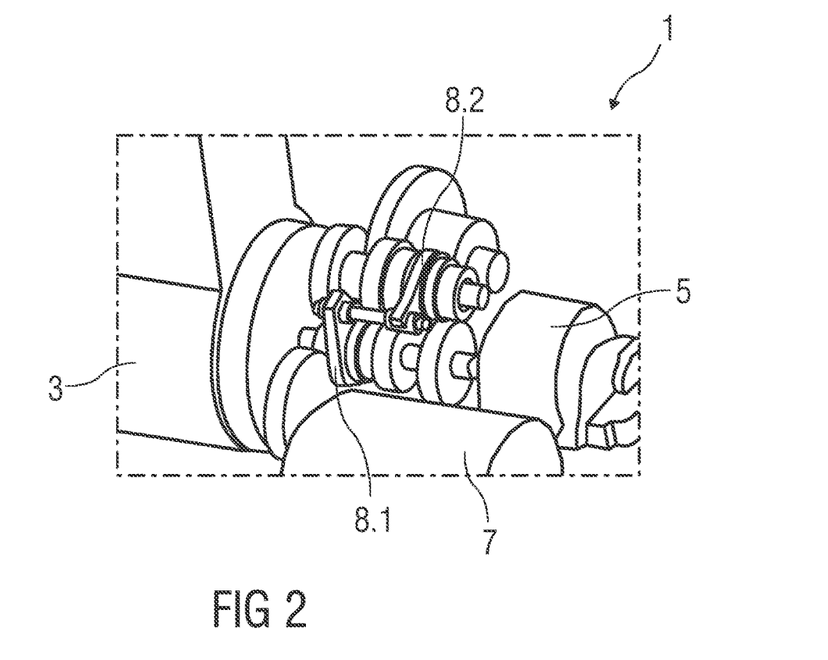
FIG. 2 is a schematic perspective view of the gearbox.

FIG. 2 is a schematic perspective view of the gearbox 1.

For simplicity, the control algorithm is described for a single dog clutch 8.1 although the control algorithm is applicable for both dog clutches 8.1, 8.2. A system architecture scheme for a gear actuator and the dog clutch 8.1, 8.2 is presented in FIG. 3.

Figure 3:
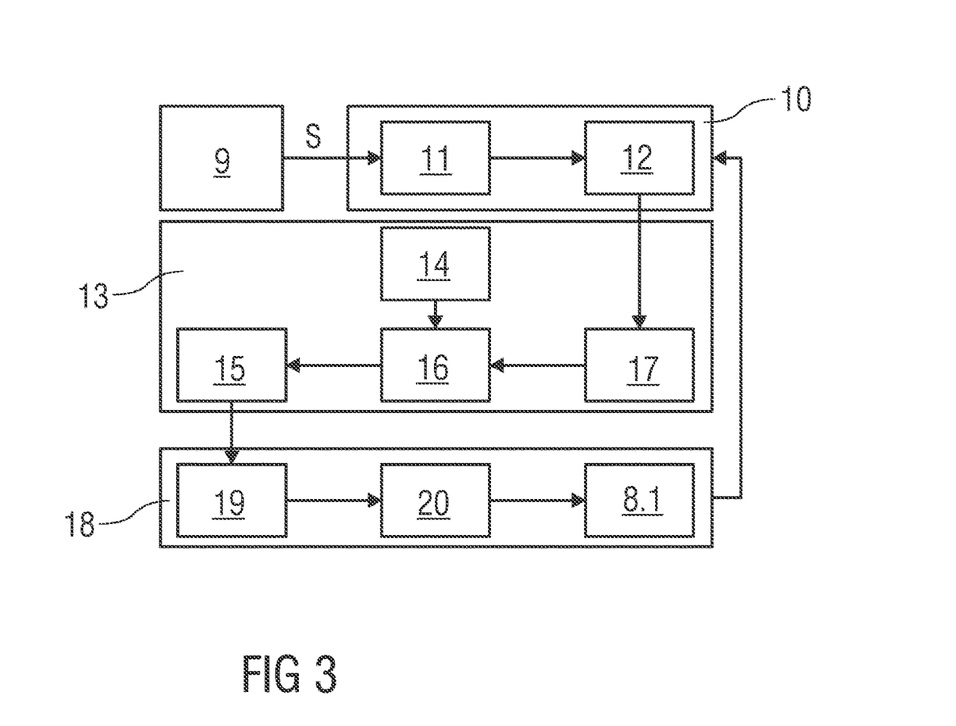
FIG. 3 is a schematic view of a system architecture for a trajectory planning control algorithm, a gear actuator and a dog clutch.

In some implementations, the system architecture includes a principal control unit 9 which may be an external unit providing shift signals S such as: Engagement gear 1, Engagement gear 2, Disengagement.

In some examples, a control algorithm 10 includes a trajectory planner 11 and a motion controller 12. The trajectory planner 11 generates a desired arm position for the motion controller 12.

An electrical topology 13 of the system architecture may include a voltage supply 14, a DC motor 15, an H-bridge 16 and a PWM interface 17. The voltage supply 14 supplies a voltage to the H-bridge 16 which powers the DC motor 15. The H-bridge 16 is controlled by PWM signals generated by the PWM interface 17. A duty cycle of the PWM signals is calculated by the motion controller 12 based on the sliding mode theory.

The PWM interface 17 generates the PWM signals for power switches, e.g. MOSFETs or IGBTs, in the H-bridge 16 depending on the duty cycle calculated by the motion controller 12. The DC motor 15 provides torque to a mechanical topology 18.

The mechanical topology 18 includes a gear train 19, an actuator arm 20 and a dog clutch 8.1.

The gear train 19 amplifies torque from the DC motor 15 and reduces the speed. The actuator arm 20 changes angular movement to linear movement. The dog clutch 8.1 is the component moved by the actuator arm 20. Its function is to mechanically engage or disengage the different gears inside the gearbox 1.

Figure 4:
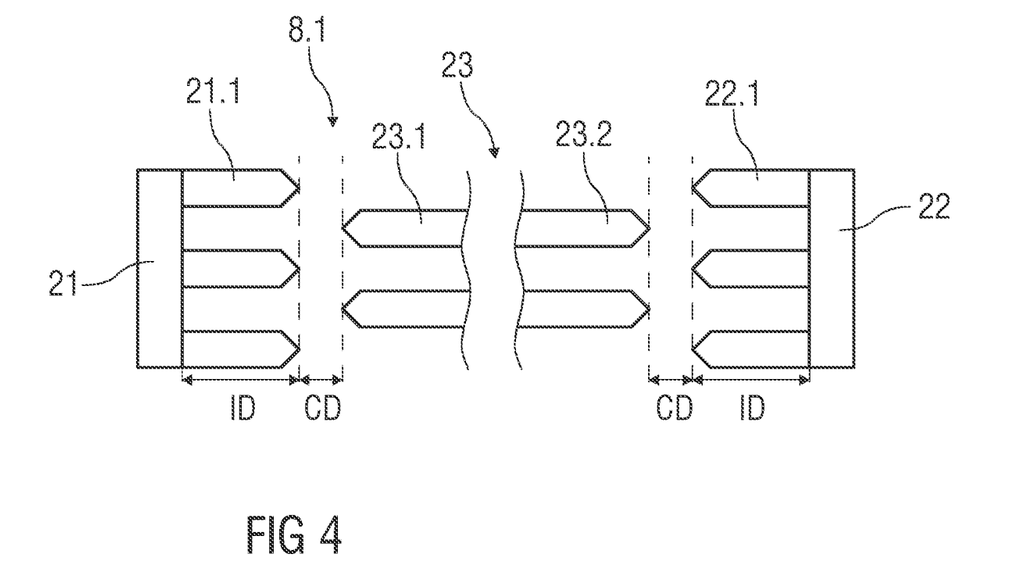
FIG. 4 is a schematic view of a dog clutch in a disengage position.

FIG. 4 is a schematic view of a dog clutch 8.1 in a disengage position (e.g. the actuator arm 20 has a position of 0 mm) with an insertion distance ID and a clearance distance CD. The dog clutch 8.1 includes a first gear 21 having one or more dogs 21.1, a second gear 22 having one or more dogs 22.1 and a sliding sleeve 23 arranged between the first gear 21 and the second gear 22 and having one or more dogs 23.1 to engage between the dogs 21.1 of the first gear 21 and one or more dogs 23.2 to engage between the dogs 22.1 of the second gear 22, where the sliding sleeve 23 is either not engaged to any one of the first gear 21 and second gear 22 in a neutral position as shown in FIG. 4 or engaged to only one of them. The insertion distance ID is the depth by which the dogs 21.1, 23.1 or 22.1, 23.2 can engage each other. The clearance distance CD is the spacing between the dogs 21.1, 23.1 and 22.1, 23.2 when the sliding sleeve 23 is in the neutral position.

The first gear 21, the second gear 22 and the sliding sleeve 23 are arranged about a shaft, where the sliding sleeve 23 is rotatably coupled to the shaft and the first gear 21 and second gear 22 can rotate about the shaft.

The position of the actuator arm 20 is the same as the position of the sliding sleeve 23 and a force is applied to the sliding sleeve 23 by the actuator arm 20. The engagement process for the first gear 21 is the same as for the second gear 22.

Figure 5A:
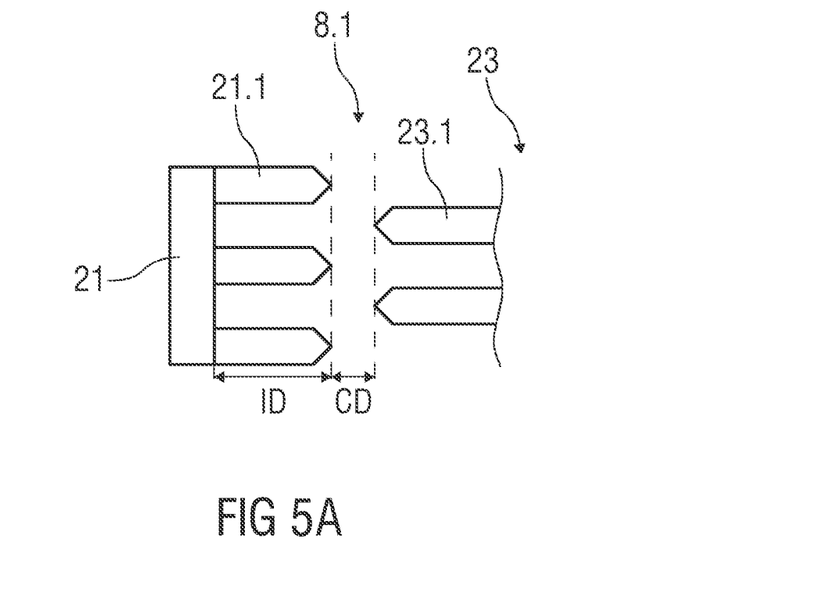
FIGS. 5A-C show schematic views of the dog clutch in different positions.
Figure 5B:
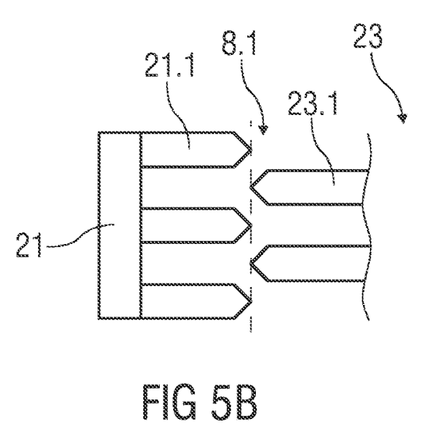
Figure 5C:
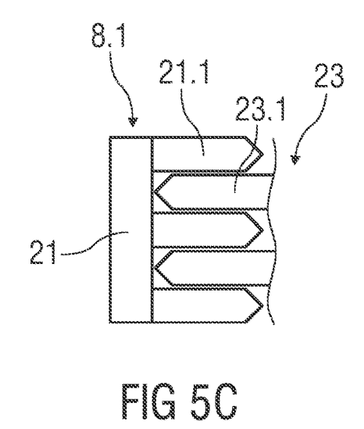

The engagement process is shown in FIGS. 5A-C and has three phases:

In a first phase P1 shown in FIG. 5A which may be referred to as the approximation, the sliding sleeve 23 is accelerated along the shaft towards the dogs 21.1 of the first gear 21.

In a second phase P2 shown in FIG. 5B which may be referred to as the contact, the sliding sleeve 23 is close to a so called kiss point, the sliding sleeve 23 decelerates until it almost contacts the dogs 21.1 of the first gear 21. After moving with low speed, there is certain contact between the sliding sleeve 23 and the dogs 21.1 of the first gear 21 with small contact force magnitude.

In a third phase P3 shown in FIG. 5C which may be referred to as the insertion, the applied force and the resulting velocity of the sliding sleeve 23 towards the first gear 21 is gradually increased in order to insert every dog 21.1 of the first gear 21 in the clearances between the dogs 23.1 of the sliding sleeve 23. Finally, the first gear 21 and the sliding sleeve 23 rotate with the same speed.

The disengagement process D is simpler, the sliding sleeve 23 is accelerated towards a disengage position and when the sliding sleeve 23 disengages from the dogs 21.1 of the first gear 21 and is close to the disengage position, it decelerates until reaching the disengage position and acceleration zero. The trajectory planner 11 generates the desired position of the actuator arm 20 based on a 4th order trajectory planning algorithm, where a derived jerk profile is defined and integrated four times to obtain a motion profile.

Figure 6:
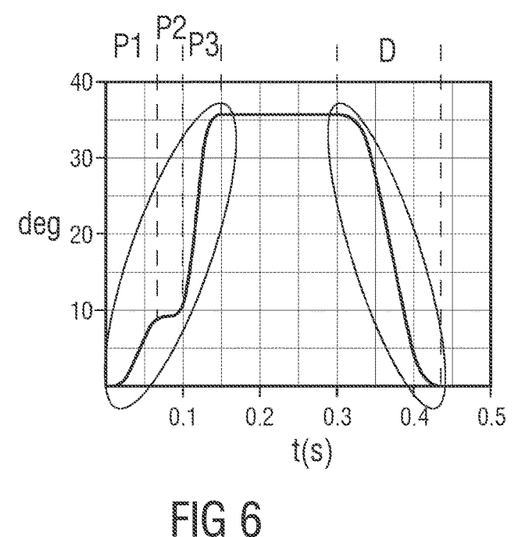
FIG. 6 is a schematic diagram illustrating an exemplary engagement and disengagement profile.
Figure 7:
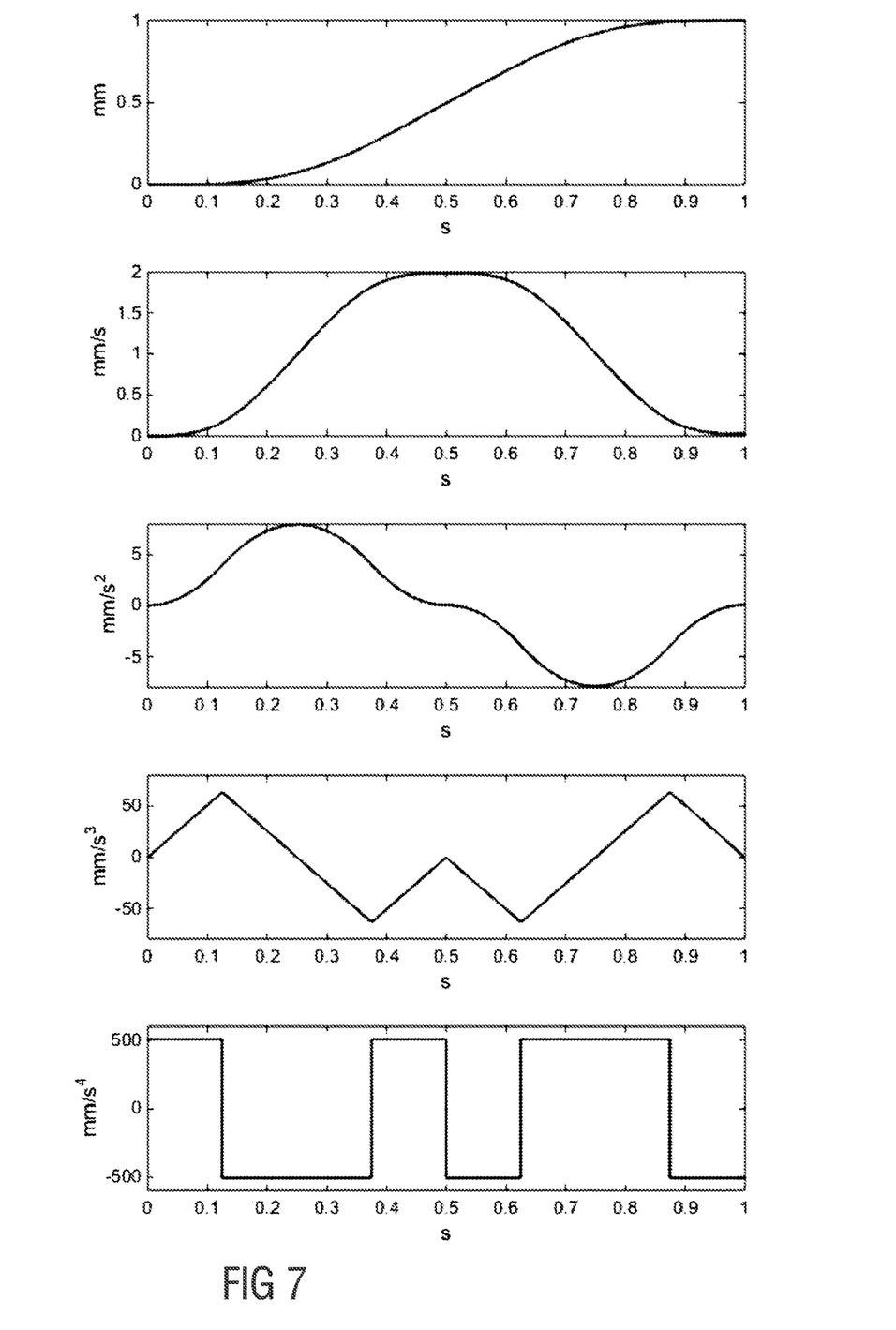
FIG. 7 shows schematic diagrams illustrating generation of a motion profile based on the derived jerk.

FIG. 6 is a diagram illustrating an engagement and disengagement profile as a desired trajectory for the position of the actuator arm 20. FIG. 7 shows diagrams illustrating an example of how to generate a motion profile based on the derived jerk. In this way, fast and smooth acceleration profiles to reduce impact forces are generated.

In order to design a motion controller 12, the discrete-time model of a DC motor 15 is presented as:

$$\theta_{k+1} = \theta_k + T_s(\omega_k)$$

$$\omega_{k+1} = \omega_k + T_s\left(\frac{k_t}{J}i_k - \frac{1}{J}\tau_{L,k}\right)$$

$$i_{k+1} = i_k + T_s\left(-\frac{R}{L}i_k - \frac{k_e}{L}\omega_k + \frac{1}{L}u_k\right)$$

$$\tau_{m,k} = k_t i_k$$

In these equations, the states x are: $\theta$ rotor position, $\omega$ rotor speed, i armature current, $\tau_m$ mechanical torque. The parameters are: R armature resistance, L armature inductance, $k_t$ torque constant, $k_e$ counter-electromotive force (CEMF) constant, J motor inertia, $T_S$ sampling time, and u armature voltage. $\tau_L$ is a load torque and unknown disturbance, and the subscript k is the sampling instant. Further, the armature voltage is equal to u=DutyCycle·VDC, where VDC is the voltage supply magnitude.

Considering the gear train 19 and the inertia effects, an equivalent inertia was used. Assumed is a two-stage gear train 19 with meshing gears G1, G2 and G3, G4 coupled to a DC motor 15 and a rotational load 24, as shown in FIG. 8.

Figure 8:
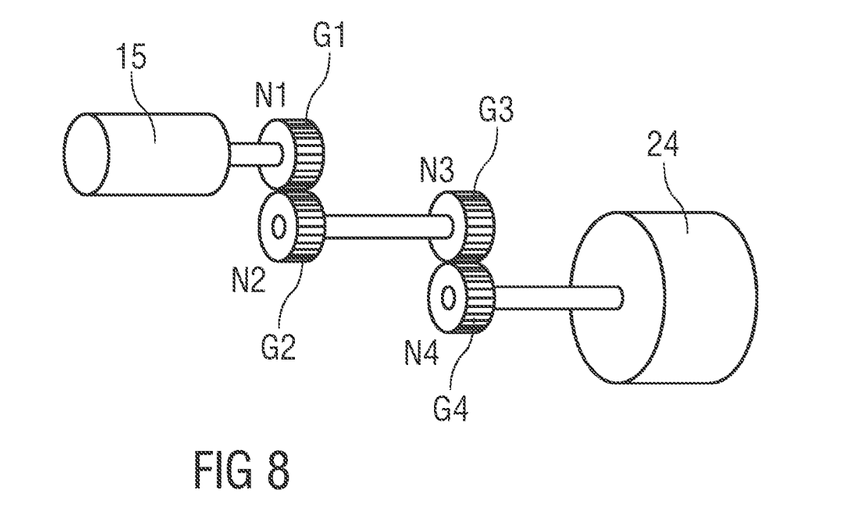
FIG. 8 is a schematic view of a two-stage gear train with meshing gears coupled to an electric motor and a rotational load.

Referring to FIG. 8, N1-N4 represent the number of teeth of the respective gear G1, G2, G3, G4. Using the following equation it is possible to estimate an equivalent inertia:

$$J_{eq} = J_{motor} + J_{gear\,1} + \left(\frac{N_1}{N_2}\right)^2\left(J_{gear\,2} + J_{gear\,3} + \left(\frac{N_3}{N_4}\right)^2(J_{gear\,4} + J_{load})\right)$$

With $J_{xx}$ representing the rotational inertias (kgm2) of the different components. The terms N1/N2 and N3/N4 are the inverse of the gear ratios. Finally, the term $J_{load}$ would represent the transformed rotational inertia of the actuator arm 20 which in this case equals zero because the linear inertia of the actuator arm 20 is already considered in the actuator arm model.

Looking at the equivalent inertia, it is evident that the motor and first gear inertias are predominant, while the effects of the remaining gears is diminished by the reductions. The terms $(N1/N2)^2$ and $(N3/N4)^2$ are considerably small, which in turn minimizes the effect of the inertias multiplying them. Therefore, the motor inertia J is replaced by the equivalent inertia $J_{eq}$ in the mathematical model of the DC motor 15.

In this case, an angular position sensor may be used to estimate the speed. The angular position sensor may be located between the gearbox 1 and the actuator arm 20. In this case the reduction of the gearbox 1 has to be considered for the mathematical model of the DC motor 15. Since the power exerted by the DC motor 15 is the same at the input and at the output of the gearbox 1, $\tau'_m$ and $\omega'$ are the torque and the speed at the output of the gearbox 1, it can be written as:

$$\tau'_m\omega'=\tau_m\omega$$

where $\omega'=\omega/n$ and $\tau'_m=n\tau_m$ with n as the reduction; also the angular position at the actuator arm 20 is represented as $\theta'=\theta/n$. According to the available variables for measurement, position $\theta'$ of the actuator arm 20, the mathematical model of the DC motor 15 is defined as:

$$\theta'_{k+1} = \theta'_k + T_s(\omega'_k)$$

$$\omega'_{k+1} = \omega'_k + T_s\left(\frac{k_t}{nJ_{eq}}i_k - \frac{1}{nJ_{eq}}\tau_{L,k}\right)$$

$$i_{k+1} = i_k + T_s\left(-\frac{R}{L}i_k - \frac{k_e}{L}n\omega'_k + \frac{1}{L}u_k\right)$$

$$\tau_{m,k} = k_t i_k$$

$$\tau'_{m,k} = nk_t i_k$$

Sliding Mode Controller with a Reduced Sliding Surface

The objective of this proposed motion controller is to avoid dependency of the system parameters as R, L, $k_t$, $k_e$, J, and to avoid using the motor current variable in order to mitigate ripple torque and chattering in the control variable. The output variable of the motion controller is the duty cycle for the PWM interface 17, FIG. 3 illustrates a control scheme. In order to describe the control synthesis, the state variables, the measured variables and the variables to be controlled as x=[$\theta'$, $\omega'$, i, $\tau_{m,k}$], $\eta$=[$\theta'$, i] and $\gamma$=$\theta'$, are respectively defined.

First, the tracking error is defined as:

$$z_{1,k}=\theta'_k-\theta'_{d,k}$$

where $\theta'_{d,k}$ is the desired value for the angular position of the actuator arm 20, defined by the trajectory planner and it is an appropriately bounded signal with bounded increments.

Then, the reduced sliding surface is proposed only as a function of the tracking error of the position of the actuator arm 20 as follows:

$$s_k = cz_{1,k} + c_d\frac{d}{dt}z_{1,k}$$

A stabilization term c is added to reach the sliding surface asymptotically and to avoid high gain control, and an integral term ca is added to reject unmodeled dynamics and to reduce the steady state error.

Then, the control variable u is calculated with a super-twisting algorithm which is based on a second order sliding mode controller and which is defined as $$u_k = -K_{ST_1}\sqrt{|s_k|}\text{sign}(s_k) + \gamma_k$$

$$\gamma_{k+1} = \gamma_k - T_s(K_{ST_2}\sqrt{|s_k|}\text{sign}(s_k) + K_{ST_3}\gamma_k)$$

with $\gamma$ as a state of the super-twisting algorithm and $K_{ST_1}$, $K_{ST_2}$, $K_{ST_3}$ as positive control gains. Then, the closed loop system reaches the sliding manifold s=0 in finite time and therefore the tracking error of the position of the actuator arm 20 tends to zero.

The desired trajectory profile in degrees is presented in FIG. 6, where the objective is to engage and disengage in a time of 150 ms using the proposed sliding mode controller.

The performance of the control algorithm is adequate and the time for the engage and disengage processes D is lower than 150 ms.

The proposed controller, i.e. the sliding mode controller with a reduced sliding surface, is simple to implement. Moreover, this controller does not need the motor current variable, just is used for protection in this controller and also, knowledge of the parameters is not necessary.

The method according to the disclosure, for example, the sliding mode controller with a reduced sliding surface, allows for a fast and smooth engagement and disengagement of a dog clutch system, e.g. with the following characteristics:

engagement process in 150 ms or less,
disengagement process D in 150 ms or less,
control of a DC motor 15 as an actuator of the dog clutch system,
robust and simple control algorithm to implement in a low-cost microcontroller,
tracking of smooth motion profiles to reduce impact on the dogs,
no dependency on system parameters.

The dog clutch system does not need to have synchronizing cones or rings which makes the system simple and small and at the same time increases the difficulty of engagement. The control algorithm provides flexibility to be implemented in different dog clutch geometries.

The control algorithm may be applied in any system where a position is to be controlled by a DC motor 15 as an actuator for tracking of fast and smooth trajectory profiles. Other applications may be in continuous variable transmission (CVT).

The proposed control algorithm has been implemented on a test bench. The test bench includes the following mechanical components:

gear train 19 being used to amplify the torque and to reduce the speed of the DC motor 15,
actuator Arm 20 for converting the torque into a force in order to apply the force to a shift fork of a dog clutch 8.1,
dog clutch 8.1 for mechanically engaging or disengaging different gears inside the gearbox 1. The dog clutch 8.1 includes two gears 21, 22, a sliding sleeve 23 which slides on a hub by the force applied on the shift fork.

Moreover, the test bench includes different electrical components:

DC motor 15 for providing the torque to the gear train 19,
an angular sensor for measuring the position of a shaft between the gear train 19 and the actuator arm 20,
a power supply voltage 14
an electric control unit which is integrated by the h-bridge 16, the PWM interface 17 and microcontroller where is implemented the trajectory planner 11 and motion controller 12.

The desired trajectory profile in degrees for the arm actuator applies the three proposed phases, approximation, contact and insertion for the engagement process, in 150 ms and the disengagement process D is carried out in 150 ms, too.

The results present satisfactory engagement and disengagement within a time of 150 ms despite disturbances in the insertion, the mechanical tolerance and the backlash on the gears. Furthermore, the control algorithm is able to adapt the trajectory profile according to the unknown relative position of the gears in insertion, to engage with different speeds between gears and disengage with different torque loads.

A number of implementations have been described. Nevertheless, it will be understood that various modifications may be made without departing from the spirit and scope of the disclosure. Accordingly, other implementations are within the scope of the following claims.

What is claimed is:

1. A method of controlling a dog clutch configured to engage at least one gear of a gearbox by a gear actuator having a DC motor, the DC motor configured to move the dog clutch via an actuator arm, the method comprising:
   supplying the DC motor with a pulse width modulated voltage having a duty cycle provided by a control algorithm, the control algorithm comprising a trajectory planner generating a desired position of the actuator arm based on a $4^{th}$ order trajectory planning algorithm and a motion controller for tracking a desired position of the actuator arm, the $4^{th}$ order trajectory planning algorithm includes integrating a derived profile four time; and
   moving the dog clutch by the DC motor via an actuator arm based on the pulse width modulation voltage, the dog clutch configured to engage the at least one gear.

2. The method of claim 1, wherein the trajectory planner defines a desired position of the actuator arm for the motion controller.

3. The method of claim 2, wherein the desired position of the actuator arm is proposed based on derived jerk profiles.

4. The method of claim 2, wherein the desired position of the actuator arm for an engagement process of the dog clutch is defined by three phases: approximation, contact and insertion.

5. The method of claim 4, wherein the three phased engagement process is carried out in 150 ms or less.

6. A method of controlling a dog clutch configured to engage at least one gear of a gearbox by a gear actuator having a DC motor, the DC motor configured to move the dog clutch via an actuator arm, the method comprising:
   supplying the DC motor with a pulse width modulated voltage having a duty cycle provided by a control algorithm, the control algorithm comprising a trajectory planner generating a desired position of the actuator arm based on a $4^{th}$ order trajectory planning algorithm and a motion controller for tracking a desired position of the actuator arm, the $4^{th}$ order trajectory planning algorithm includes integrating a derived profile four time; and
   moving the dog clutch by the DC motor via an actuator arm based on the pulse width modulation voltage, the dog clutch configured to engage the at least one gear, wherein the motion controller applies a sliding mode control, wherein the sliding mode control defines a sliding surface.

7. The method of claim 6, wherein the sliding mode controller comprises a super-twisting algorithm based on a second order sliding mode controller.

8. The method of claim 6, wherein the sliding mode controller is independent of a motor current of the DC motor to avoid torque ripple and chattering on a control variable used to estimate the duty cycle.

9. The method of claim 6, wherein a reduced sliding surface is defined for the sliding mode controller as a function of a single tracking error variable for the position of the actuator arm.

10. The method of claim 9, wherein the reduced sliding surface is based on a stabilization term to reach the sliding surface asymptotically and to avoid high gain control, and based on an integral term to reject unmodeled dynamics and to reduce a steady state error.

11. The method of claim 9, wherein the reduced sliding surface is independent of system parameters and gear geometries.

12. The method of claim 6, wherein a super-twisting algorithm is used to calculate a control variable which is used to estimate the duty cycle.

13. An arrangement comprising:
a gearbox comprising a number of gears and a dog clutch configured to engage at least one of the gears); and
a gear actuator comprising a DC motor configured to move the dog clutch via an actuator arm and configured to control the dog clutch executing a method, the method comprising:
supplying the DC motor with a pulse width modulated voltage having a duty cycle provided by a control algorithm, the control algorithm comprising a trajectory planner generating a desired position of the actuator arm based on a $4^{th}$ order trajectory planning algorithm and a motion controller based for tracking a desired position of the actuator arm, the $4^{th}$ order trajectory planning algorithm includes integrating a derived profile four time; and
moving the dog clutch by the DC motor via an actuator arm based on the pulse width modulation voltage.

14. The arrangement of claim 13, wherein the gearbox is a dedicated hybrid transmission.

* * * * *